United States Patent [19]

Hughes

[11] 4,069,839

[45] Jan. 24, 1978

[54] GAS PRESSURE REGULATOR

[75] Inventor: George C. Hughes, Anderson, Ind.

[73] Assignee: Textron Inc., Providence, R.I.

[21] Appl. No.: 687,301

[22] Filed: May 14, 1976

[51] Int. Cl.² .......................................... F16K 31/12
[52] U.S. Cl. ........................ 137/505.46; 137/505.47; 137/593
[58] Field of Search ................. 137/505, 593, 116.5, 137/505.38, 505.39, 505.43, 505.42, 505.41, 505.46, 505.47

[56] References Cited

U.S. PATENT DOCUMENTS

| | | | |
|---|---|---|---|
| 2,517,484 | 8/1950 | Henneman | 137/505.46 X |
| 3,003,520 | 10/1961 | Corey | 137/505.47 X |
| 3,221,762 | 12/1965 | Chinn | 137/116.5 |
| 3,488,685 | 1/1970 | Hughey | 137/116.5 |

*Primary Examiner*—Harold W. Weakley
*Attorney, Agent, or Firm*—Arthur A. Johnson

[57] ABSTRACT

There is disclosed herein a diaphragm-operated gas regulator in which the diaphragm and valve operating means are protected against being damaged when subjected to excessive force resulting from excessively high pressure in the gas chamber of the regulator due to malfunctioning of the regulator.

4 Claims, 2 Drawing Figures

GAS PRESSURE REGULATOR

This invention relates to gas regulators and more particularly to means for avoiding damage to parts of the regulator resulting in excess gas pressure in the gas chamber of the regulator.

In some types of gas regulators, the flow of the gas into the gas chamber under the diaphragm is controlled by a valve which is moved closer to or farther from an inlet orifice by a bellcrank, one arm of which is connected to a diaphragm responsive to the pressure of the gas in the gas chamber.

In such regulators if for some obstruction or malfunction the valve does not shut off the flow of gas, the diaphragm will reach a position in which its further movement is prevented, for instance by the diaphragm or something on it engaging an immovable part of the regulator.

If after this occurs the pressure of the gas under the diaphragm increases, the connection between the valve and the diaphragm, the bellcrank in the form shown, will be bent or broken, thereby so damaging the regulator as to make it necessary to disconnect the regulator from the gas line, disassemble the regulator, replace the damaged part, reassemble the regulator and return it to the inlet and outlet lines.

In practical use, it has been found that frequently, if the malfunctioning of the regulator results from the lodging of foreign matter between the regulating valve and the valve seat, after a change of pressure difference on the inlet and outlet of the regulator, the foreign matter frees itself and the regulator resumes its function of regulating the pressure of gas passing to the system, but the regulation will not be that intended if the bellcrank is bent or broken.

A feature of the present invention is the provision of means for preventing the bending or breaking of the bellcrank by the excessive force applied to it under such malfunctioning conditions. Briefly stated, this is accomplished by providing means which allows the diaphragm to move under excessive force without imparting the excessive force to the arrested bellcrank.

Figure 1:
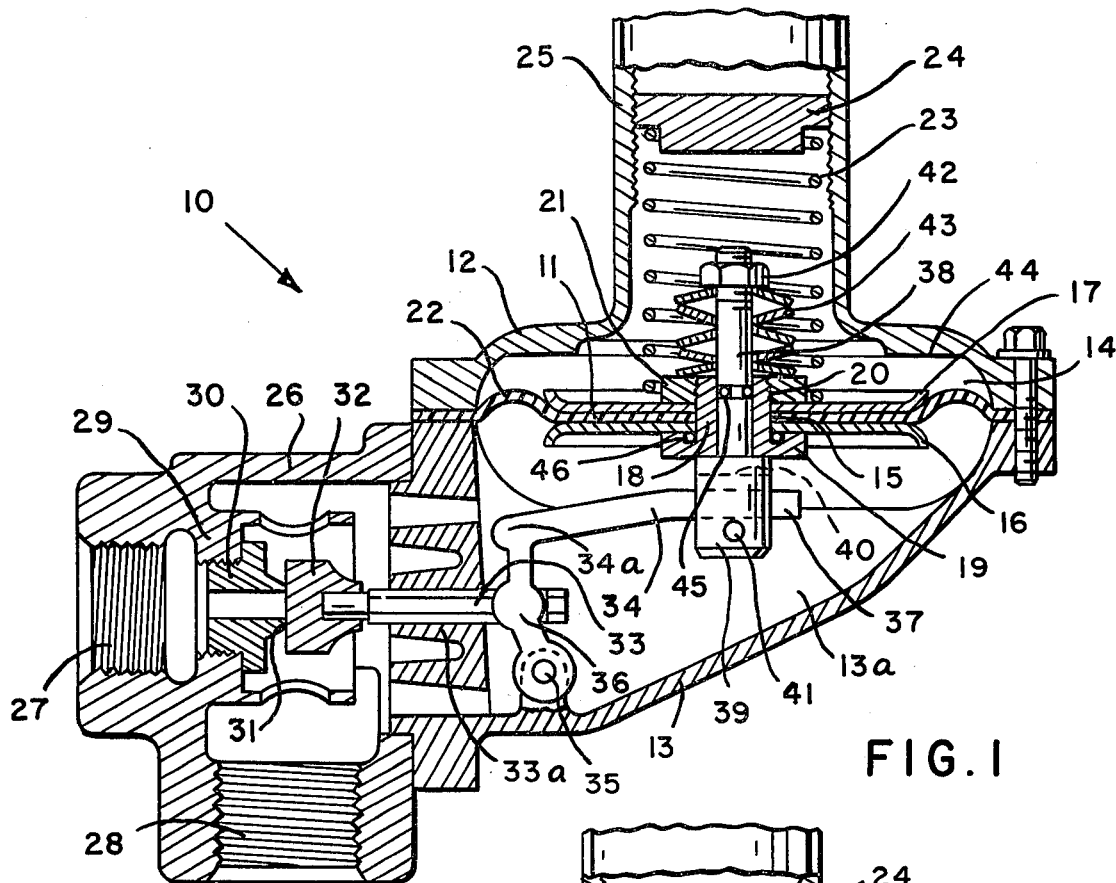
FIG. 1 is a vertical section of one type of gas regulator showing the diaphragm and other parts in the positions they occupy when the flow of gas is being regulated.

As shown in the drawings, a housing 10 has a flexible diaphragm 11, preferably of synthetic material, stretched across the space between a cover portion 12 and a pressure chamber portion 13 between which the diaphragm 11 is securely clamped and forms a permanently sealed gas pressure chamber 13a and an atmospheric pressure chamber 14.

The diaphragm 11 has a central hole 15 and is clamped between two plates, a bottom plate 16 and a top plate 17, by a bushing 18 having a head 19 engaging the bottom plate 16 and a screw threaded portion 20 carrying a nut 21 which engages the top plate 17. An annular bulge 22 in the diaphragm flexes as the diaphragm moves between its lower position shown in FIG. 1 and its upper position shown in FIG. 2 in response to gas pressure in the pressure chamber 13a.

To oppose the rising movement of the diaphragm 11 as the gas pressure in chamber 13a increases, there is provided a spring 23, one end of which engages the top plate 17 with the other end engaging a nut 24 threaded in a tubular extension 25 of the cover 12.

The regulator shown herein has a valve housing 26 having an inlet 27 and an outlet 28 having a dividing wall 29 provided with bushing 30 having an orifice and having a valve seat 31 defining the area through which gas must pass from the inlet 27 to the outlet 28 and into the gas pressure chamber 13a.

To control the passage of gas to the outlet 28 there is provided a valve 32 which is mounted on a valve rod 33 slidably mounted in a wall 33a. The valve rod 33 is moved toward and from the valve seat 31 by a lever pivotally mounted at 35 on the base and having an intermediate portion 36 engaging the valve rod 33 and a terminal portion 37 and another intermediate portion 34a which engages a portion of the wall 33a which limits the movement of the lever 34 in valve closing direction.

Heretofore, it was necessary to limit the excess pressure build-up on the diaphragm assembly by use of over-pressure protection means, such as disclosed in U.S. Pat. No. 3,488,685 in which the lever operated by the diaphragm is connected to a valve which allows gas under excessively high pressure to escape past the diaphragm into the atmospheric pressure chamber and to the atmosphere. However, according to the present invention the diaphragm permanently seals the atmospheric chamber and means are provided for allowing the diaphragm assembly to travel to a fixed stop and be in complete contact with the cover 12 and without the risk of damaging the diaphragm or bending or breaking the lever 34 operated thereby.

For this purpose, there is slidably mounted in the bushing 18 a rod 38, the lower end 39 of which has a slot 40 shaped to slidably receive the end portion 37 of the lever 34 and ride on a roller 41 mounted on the lower end 39. Between the nut 21 on the bushing 18 and a nut 42 on the rod 38 there is provided a plurality of Belleville springs 43 which are placed under compression by adjusting the nut.

In the normal operation of the regulator, when the gas pressure in the pressure valve rises, the diaphragm is pushed upwardly and this causes the rod 38 to rise, swinging the lever upwardly and causing the valve rod 33 and valve 32 to move more or less toward the orifice to reduce the pressure in the pressure chamber and, of course, in the outlet 28. When the gas pressure reduces, the diaphragm descends and the valve 32 moves away from the orifice allowing an increase in the flow of gas.

In the event of some malfunctioning of the regulator, for instance when a piece of foreign matter wedges itself between the valve seat 31 and the valve 32 so that the flow of gas may not be reduced or shut off, the force applied to the diaphragm may cause it to be damaged and the lever 34 may be broken or bent. If such damage occurred, it would be necessary to disassemble the regulator and replace the damage part which is not only expensive but would require the discontinuance of the gas service supply by the regulator.

Figure 2:
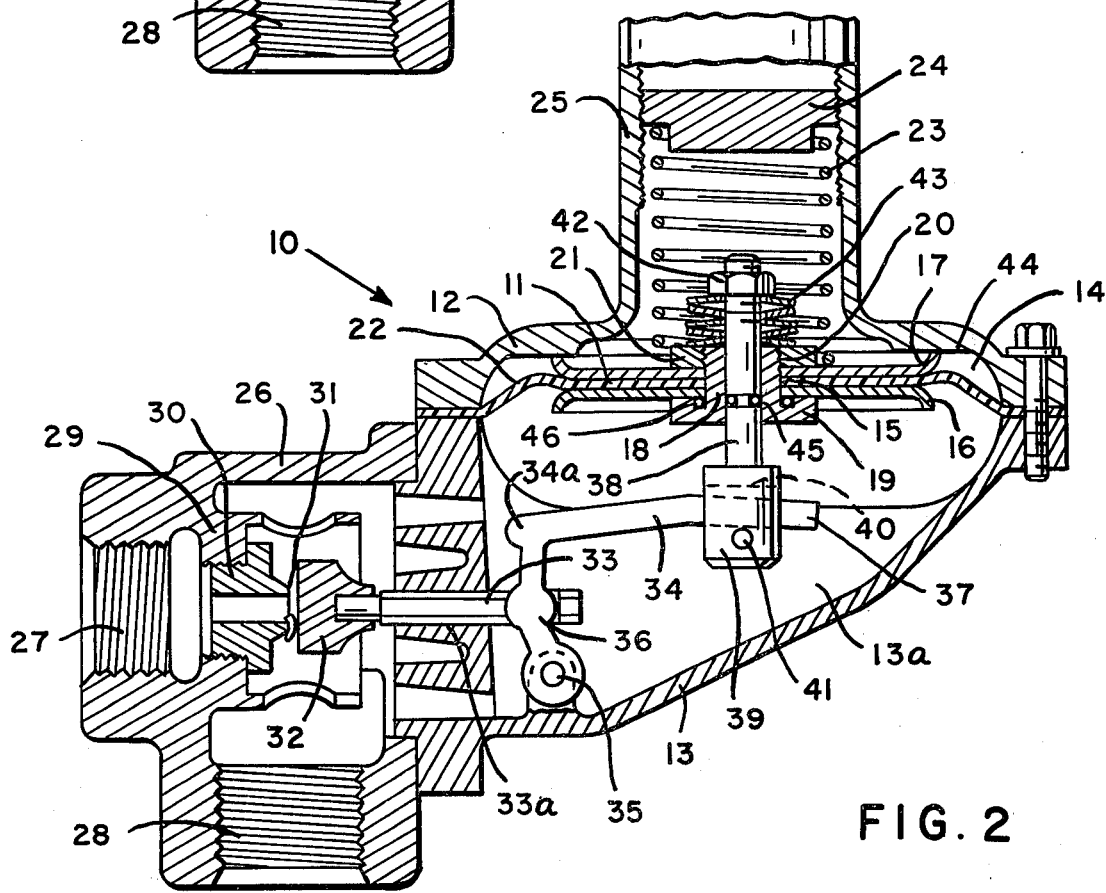
FIG. 2 is a vertical section showing the movable parts in the positions they occupy when the main valve is prevented from closing even though there is excessively high gas pressure in the gas chamber of the regulator and showing the safety means activated to prevent the breaking of the bellcrank.

To avoid such damage the present invention provides means whereby, when the lever 34 is arrested with the valve 32 in open position and the pressure of the gas in the chamber 13a increases, the diaphragm may continue to rise until the top plate 17 engages a stop surface 44 on the cover 12 of the regulator as shown in FIG. 2. However, while this is occurring the Belleville springs 43 yield and allow the rod 38 to slide through the bushing 18 without any damaging strain on the lever 34 or the diaphragm 11.

An O-ring 45 keeps gas from passing into the atmospheric chamber 14 through the clearance between the rod 38 and the bushing 18. Also an O-ring 46 in the flange 19 keeps gas from escaping into the chamber 14 in any space there may be between the flange 19 and the lower plate 16.

It should be understood that in the normal operation of the regulator the Belleville springs do not yield, the diaphragm being entirely under the control of the spring 23 and that the Belleville springs 42 yield as the force on the lever 34 approaches the breaking point.

Variations and modifications may be made within the scope of the claims and portions of the improvements may be used without others.

I claim:

1. A pressure regulator having a housing and a cover therefor; a flexible diaphragm clampled therebetween and forming a gas pressure chamber and an atmospheric pressure chamber; spring means, said diaphragm being responsive, against the force of said spring means, to the gas pressure in said gas pressure chamber; stop means for arresting the movement of said diaphragm in response to predetermined excess pressure in the gas pressure chamber; means connected to the diaphragm for regulating the flow of gas to said gas pressure chamber and including a flow control valve and actuating means therefor connected to said diaphragm, said actuating means including a lever and a push-pull sliding connection including auxiliary spring means for operatively connecting said diaphragm and said lever, stop means for arresting the movement of said lever in response to excessive pressure in said pressure chamber, said auxiliary spring means yielding in response to excess gas pressure in the pressure chamber on said diaphragm after the lever has been arrested by its said stop means to protect said diaphragm and said lever from damage, said stop means for arresting the movement of the diaphragm comprises a first metal plate carried by the side of the diaphragm in the atmospheric pressure chamber and having peripheral edge portions positioned to engage stationary parts of said cover, a second metal plate engaging the side of the diaphragm in the gas pressure chamber; and means connecting said plates together with the diaphragm sandwiched between them comprising a bushing extending through aligned holes in said diaphragm and said plates, said bushing having a flange engaging said second metal plate and a nut engaging the first-named plate and said auxiliary spring means being interposed between said nut on said bushing and a nut on the end of said push-pull sliding connection.

2. A pressure regulator according to claim 1 in which said auxiliary spring means comprises a stack of Belleville springs.

3. A pressure regulator according to claim 1 in which said push-pull sliding connection includes sealing means between said atmospheric chamber and said pressure chamber.

4. A pressure regulator according to claim 1 in which there is sealing means between the flange of the bushing and said second metal plate.

* * * * *